United States Patent

Sasaki et al.

[11] Patent Number: 6,051,617
[45] Date of Patent: *Apr. 18, 2000

[54] FOAMED PARTICLES OF MODIFIED POLYPROPYLENE RESIN AND METHOD OF PREPARING SAME

[75] Inventors: Hidehiro Sasaki, Tochigi-ken; Masakazu Sakaguchi, Kanuma; Hisao Tokoro, Utsunomiya, all of Japan

[73] Assignee: JSP Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/904,114

[22] Filed: Jul. 31, 1997

[30] Foreign Application Priority Data

Aug. 7, 1996 [JP] Japan .................................... 8-224559
Mar. 21, 1997 [JP] Japan .................................... 8-087780
Apr. 18, 1997 [JP] Japan .................................... 9-116217

[51] Int. Cl.[7] ................................ C08J 9/20; C08J 9/22; C08J 9/224
[52] U.S. Cl. ................................ 521/59; 521/56; 521/60; 521/139
[58] Field of Search ................................ 521/56, 59, 60, 521/139

[56] References Cited

U.S. PATENT DOCUMENTS

| 4,303,756 | 12/1981 | Kajimura et al. | 521/59 |
| 4,303,757 | 12/1981 | Kajimura et al. | 521/59 |
| 4,657,937 | 4/1987 | Kuwabara et al. | 521/56 |

FOREIGN PATENT DOCUMENTS 59-157127  2/1983  Japan .

*Primary Examiner*—Morton Foelak
*Attorney, Agent, or Firm*—Lorusso & Loud

[57] ABSTRACT

A foamed, non-crosslinked resin particle having a bulk density of not greater than 0.045 g/cm$^3$ and an average cell diameter of at least 200 μm. The non-crosslinked resin includes a polypropylene resin to which a vinyl comonomer is graft-polymerized in such an amount that the weight ratio of the polypropylene resin to the grafted polymer of the vinyl comonomer is in the range of 97:3 to 65:35. The foamed resin particles are produced by grafting a vinyl comonomer to polypropylene resin particles at a temperature of less than 90° C. in the presence of a specific radical polymerization initiator to obtain modified polypropylene resin particles and, then, expanding the modified polypropylene resin particles. The initiator used requires a temperature of not higher than 70° C. for obtaining a half life of 10 hours.

12 Claims, 1 Drawing Sheet

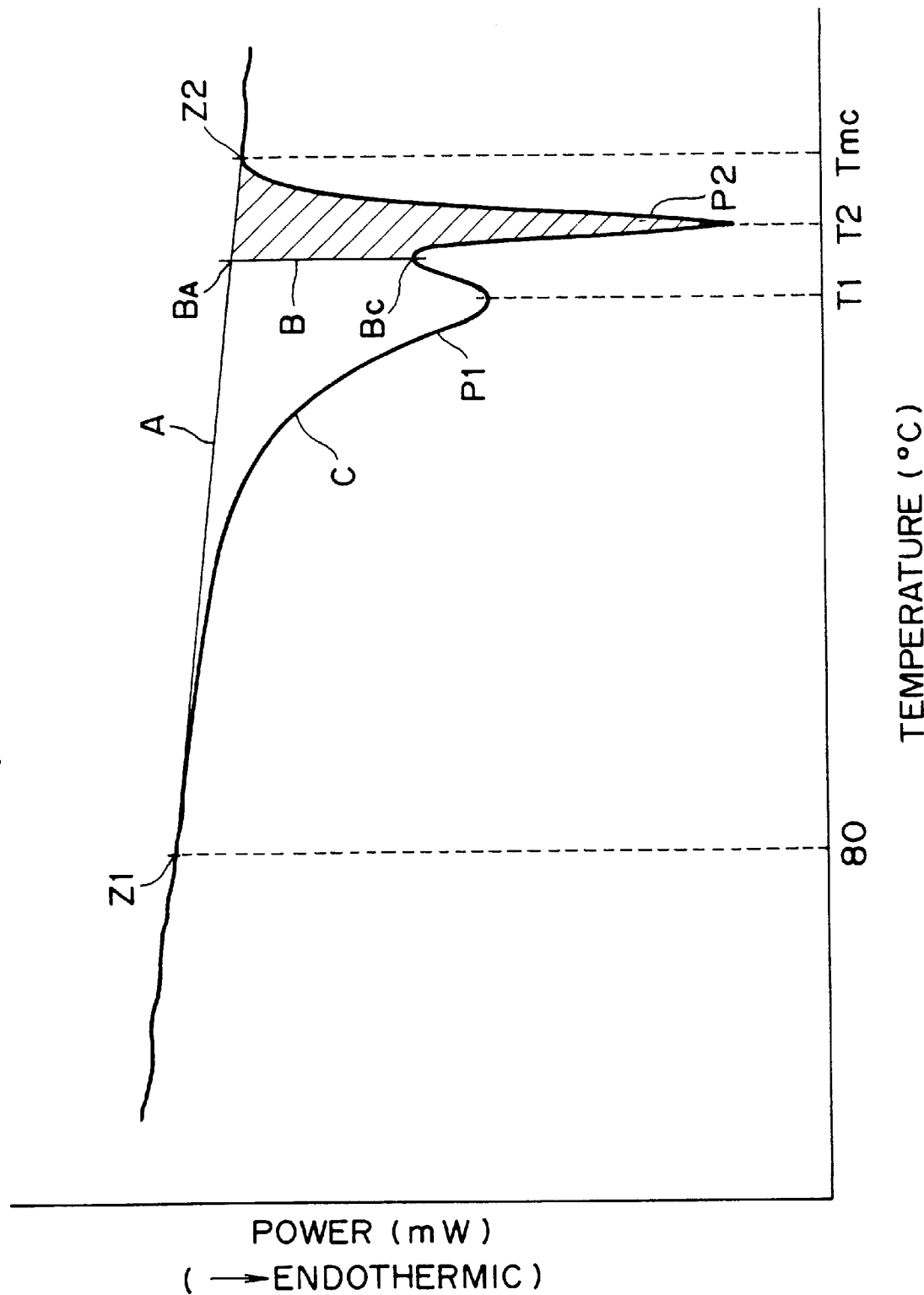

FOAMED PARTICLES OF MODIFIED POLYPROPYLENE RESIN AND METHOD OF PREPARING SAME

BACKGROUND OF THE INVENTION

This invention relates to foamed, modified polypropylene resin particles useful for molding a foamed, molded article and to a method of preparing same.

Foamed polypropylene particles are now utilized for molding foamed, molded articles because of high heat resistance and high stiffness thereof. To improve the rigidity of such molded articles, it is proposed to graft styrene to polypropylene resin.

JP-B-59-40164 discloses foamed, crosslinked polypropylene resin particles composed of 70% by weight of a polypropylene resin and 30% by weight of a polystyrene grafted to the polypropylene. Crosslinking is, however, not advantageous because the crosslinked resin cannot be regenerated or reused, because the use of a crosslinking agent invites an increase of costs and because the crosslinking requires an additional heating step.

JP-B-3-33186 discloses foamed, non-crosslinked polypropylene resin particles composed of 60% by weight of a polypropylene resin and 40% by weight of a polystyrene grafted to the polypropylene. The use of such a large amount of polystyrene, however, causes the lowering of the heat resistance and stiffness. Further, soot is apt to form when the molded product is burnt. The graft copolymer is prepared using 1,1-bis(t-butylperoxy)-3,3,5-trimethylcyclohexane as a polymerization initiator.

SUMMARY OF THE INVENTION

It has now been found that when the graft copolymerization method as disclosed in JP-B-3-33186 is adopted to produce a graft copolymer having a low content of the polystyrene (e.g. 35% by weight or less) and when the graft copolymer is used for the formation of non-crosslinked foamed particles, the average cell diameter of the foamed particles is very small. Therefore, it is necessary to use a large amount of an organic or inorganic blowing agent for expansion molding in order to produce a foamed molded article from the foamed particles. Otherwise, voids are formed on the surfaces of the molded article due to insufficient expansion of the foamed particles.

The use of a large amount of the blowing agent for expansion molding, however, causes a problem that it is necessary to cool the molded article in the molds for a long period of time, since, otherwise, the molded article released from the molds expands due to the blowing agent still remaining in the molded article. Thus, when a large amount of the blowing agent for expansion molding is used, the cooling time must be long and, hence, the shot cycle must be long. The term "shot cycle" is a term of the art meaning the time interval between the charging of the foamed particles in a mold and the release of the molded article from the mold.

The present invention has been made in view of the foregoing problems of the conventional methods.

It is, therefore, an object of the present invention to provide foamed, modified polypropylene resin particles which have a large average cell diameter and which can produce a molded article free of surface voids with a short shot cycle.

Another object of the present invention is to provide a method of producing the above foamed, modified polypropylene resin particles.

In accomplishing the foregoing objects, there is provided in accordance with one aspect of the present invention a foamed, non-crosslinked resin particle having a bulk density of not greater than 0.045 g/cm$^3$ and an average cell diameter of at least 200 μm, said non-crosslinked resin comprising a polypropylene resin to which a vinyl comonomer is graft-polymerized in such an amount that the weight ratio of said polypropylene resin to said grafted polymer of said vinyl comonomer is in the range of 97:3 to 65:35.

In another aspect, the present invention provides a method of producing foamed, non-crosslinked resin particles, comprising the steps of:

grafting a vinyl comonomer to polypropylene resin particles at a temperature of less than 90° C. in the presence of a radical polymerization initiator requiring a temperature of not higher than 70° C. for obtaining a half life of 10 hours so that modified resin particles are obtained; and foaming said modified resin particles.

BRIEF DESCRIPTION OF THE DRAWING

Other objects, features and advantages of the present invention will become apparent from the detailed description of the preferred embodiments of the invention which follows, when considered in the light of the accompanying drawing in which:

FIG. 1 is a DSC curve for explaining the area of the highest temperature peak.

DETAILED DESCRIPTION OF THE PREFERRED EMBODIMENTS OF THE INVENTION

Foamed, non-crosslinked, modified polypropylene resin particles according to the present invention may be produced by the following method.

First, a vinyl comonomer is grafted to polypropylene resin particles.

The polypropylene resin may be a homopolymer, a copolymer of propylene of a mixture thereof. Examples of the propylene copolymers include propylene-ethylene random copolymers having an ethylene content of 0.5–8% by weight, propylene-ethylene block copolymers having an ethylene content of 3–18% by weight, propylene-butene-1 random copolymers having a butene-1 content of 2–15% by weight, propylene-ethylene-butene-1 random copolymers having an ethylene content of 0.3–5% by weight and a butene-1 content of 0.5–20% by weight, propylene-hexene-1 random copolymers having a hexene-1 content of 2–6% by weight, and propylene-4-methylpentene-1 random copolymers having a 4-methylpentene-1 content of 1–8% by weight. The use of crystalline polypropylene homopolymers and copolymers is preferred. If desired, the polypropylene homopolymer and/or copolymer may be used as a mixture with a minor amount of another polymer such as polyethylene resin or ethylene-propylene rubber. The polypropylene resin particles used for the graft polymerization treatment generally have a particle size of 0.1–3 mm. The weight of one particle of the polypropylene resin is generally 0.1–20 mg.

The vinyl comonomer grafted to the polypropylene resin particles is preferably a styrene compound such as styrene, chlorostyrene, bromostyrene, vinyltoluene, vinylxylene, p-methylstyrene or α-methylstyrene.

The graft polymerization is preferably carried out as follows. Polypropylene resin particles and a vinyl comonomer are charged in an autoclave together with an aqueous medium and a dispersing agent and then heated at 70–120° C. with stirring to impregnate the particles with the comonomer. Illustrative of suitable dispersing agents are polyvinyl alcohol, methyl cellulose, calcium triphosphate, magnesium pyrrophosphate, calcium carbonate and sodium dodocylbenzenesulfonate. The dispersing agent is used in an amount of 0.01–50% by weight based on the weight of the aqueous medium. The autoclave is then cooled to below 50° C.

Thereafter, a radical polymerization initiator is added to the contents in the autoclave and the mixture is heated for effecting the polymerization. It is important that the graft polymerization should be carried out at a temperature of below 90° C., preferably 50–89° C. A graft polymerization temperature of 90° C. or more cannot produce foamed modified polypropylene resin particles having a large average cell diameter.

It is also important that the radical polymerization initiator should be such that the temperature for providing 10 hours of a half life thereof is not higher than 70° C. The half life of the polymerization initiator is defined as a period of time required for decomposing a half amount of the initiator.

Examples of the radical polymerization initiator requiring a temperature of not higher than 70° C. for obtaining its half life of 10 hours include bis(4-t-butylcyclohexyl) peroxydicarbonate, 1-cyclohexyl-1-methylethylperoxyneodecanoate, di(2-ethoxyhexylperoxy)dicarbonate, dimethoxybutylperoxydicarbonate, t-butylperoxyneodecanoate, t-hexylperoxypivalate, t-butylperoxypivalate, octanoylperoxide, stearoylperoxide, lauroylperoxide, isobutyrylperoxide, α,α'-bis(neodecanoylperoxy)diisopropylbenzene, cumylperoxyneodecanoate, di-n-propylperoxydicarbonate, 1,1,3,3-tetramethylbutylperoxyneodecanoate, di-2-ethoxyethylperoxydicarbonate, di(3-methyl-3-methoxybutylperoxy)dicarbonate, t-butylperoxyneodecanoate, 2,4-dichlorobenzoylperoxide, 3,5,5-trimethylhexanoyl-peroxide, 1,1,3,3-tetramethylbutylperoxy-2-ethylhexanoate, succinicperoxide, 2,5-dimethyl-2,5-di(2-ethylhexanoylperoxy)hexane, 1-cyclohexyl-1-methylethyl-peroxy-2-ethylhexanoate and t-hexylperoxy-2-ethylhexanoate. The radical polymerization initiator is generally used in an amount of 2–10 parts by weight per 100 parts by weight of the vinyl comonomer.

After completion of the graft polymerization, which generally requires a reaction time of 3–12 hours at the above-described reaction temperature, the autoclave is cooled and the modified polypropylene resin particles are recovered, washed, dried and then used for forming foamed particles. It is important that the weight ratio of the polypropylene resin to the grafted polymer of the vinyl comonomer is in the range of 97:3 to 65:35, preferably 95:5 to 70:30, for reasons of good heat resistance, good stiffness and good rigidity. The weight ratio of the polypropylene resin to the grafted polymer of the vinyl comonomer can be obtained by control of the feed amount of the vinyl comonomer.

The modified polypropylene resin particles are not crosslinked. The term "non-crosslinked, modified polypropylene resin particles" is intended to refer to modified polypropylene resin particles having a xylene-insoluble content of not greater than 0.5% by weight. The term "xylene-insoluble content" used herein is as measured by the following method:

Sample resin particles (about 1 g), which may be foamed or non-foamed particles, are immersed in xylene (100 ml) and the mixture is refluxed for 8 hours. The mixture is then immediately filtered through a 100 mesh (149 μm) wire net. The weight of the xylene-insoluble matters left on the sieve and dried at 20 for 24 hours is measured. The xylene-insoluble content P is defined as follows:

$$P(\%)=(G/W)\times 100$$

wherein G represents the weight (g) of the xylene-insoluble matters and W represents the weight (g) of the sample.

The modified polypropylene resin particles are then expanded to obtain foamed modified polypropylene resin particles in a manner known per se. Preferably, the resin particles are contacted with a blowing agent such as an inorganic gas, a volatile blowing agent or a mixture thereof to impregnate the resin particles with the blowing agent, heated to a temperature higher than the softening point of the resin, dispersed in a dispersing medium and maintained under a pressurized condition, thereby to obtain a dispersion maintained at a first pressure and containing expandable resin particles. By subjecting the dispersion to an atmosphere being a pressure lower than the first pressure, generally ambient pressure, the expandable resin particles are foamed and expanded. The expansion step is preferably performed by opening a valve or outlet port connected to the vessel in which the dispersion is contained under pressure, to thereby discharge the dispersion into the atmosphere. The softening point herein is as measured under a load of 4.6 kg/cm$^2$ in accordance with ASTM D-648.

Examples of the organic blowing agent include propane, butane, pentane, hexane, cyclobutane, cyclohexane, trichlorofluoromethane, trifluoromethane, dichlorodifluoromethane, chlorodifluoromethane, 1,1-difluoroethane, 1,2,2,2-tetrafluoroethane, 1-chloro-1,1-difluoroethane and 1-chloro-1,2,2,2-tetrafluoroethane. Examples of inorganic gas blowing agent include air, nitrogen, carbon dioxide, argon and helium. These organic and inorganic blowing agents may be used singly or as a mixture of two or more. The blowing agent may be suitably used in an amount of 0.5 to 50 parts by weight per 100 parts by weight of the modified polypropylene resin. The amount is properly determined in view of the intended expansion ratio, expansion temperature, etc.

The dispersing medium may be, water, ethylene glycol, glycerin, methanol or ethanol and, preferably, an aqueous medium. The amount of the dispersing medium is generally 1.5–10 times, preferably 2–5 times, that of the modified polypropylene resin particles.

To prevent melt-adhesion of the polymer particles with each other during the expansion step, it is advisable to add to the dispersion an adhesion preventing agent which is finely divided organic or inorganic solids that do not soften or melt at a temperature to which the resin particles are heated for effecting the expansion. Illustrative of suitable adhesion preventing agents are kaolin, talc, mica, alumina, titania, aluminum hydroxide and urea-formaldehyde resin particles. The adhesion preventing agent preferably has a particle size of 0.001 to 100 μm, more preferably 0.001 to 30 μm and may be used in an amount of 0.01 to 10 parts by weight per 100 parts by weight of the modified polypropylene resin particles. A surfactant such as an anionic surfactant, e.g. sodium dodecylbenzenesulfonate or sodium oleate may be suitably used in combination with the above adhesion preventing agent for further improving the adhesion-preventing effect. The amount of the surfactant is generally 0.001–5 parts by weight per 100 parts by weight of the modified polypropylene resin particles.

It is important that the expanded product, namely the foamed, modified polypropylene resin particles, should have a bulk density of not greater than 0.045 g/cm³, preferably 0.006–0.03 g/cm³ and an average cell diameter of at least 200 μm, preferably 250–600 μm, for reasons of reduction of shot cycle.

It is preferred that the foamed, modified polypropylene resin particles give such a DSC curve obtained by differential scanning calorimetry that (a) at least two endothermic peaks are present and (b) the highest temperature peak of them has an area corresponding to the calorific value of 2–25 J/g when the modified polypropylene resin has a melting point of 150° C. or less or 5–40 J/g when the modified polypropylene resin has a melting point of more than 150° C. for reasons of reduced costs for the production of foamed molded articles therefrom as well as prevention of shrinkage of the molded articles. The DSC curve herein is as obtained by the differential scanning calorimetric analysis wherein a sample (1–3 mg of the foamed, modified polypropylene resin particles) is heated from room temperature to 220° C. in an atmosphere of nitrogen at a rate of 10° C./min.

The foamed, modified polypropylene resin particles providing a DSC curve having such two peaks can be produced by maintaining the dispersion containing the modified polypropylene resin particles at a temperature between the melting point thereof and the melt-completion temperature (as defined in Japanese Industrial Standards JIS K7121) thereof for a period of time of 5–90 min, preferably 15–60 min. The area of the highest temperature peak may be adjusted by, for example, the temperature at which the modified polypropylene resin particles are maintained before expansion treatment, the time for which the modified polypropylene resin particles are maintained before expansion treatment and the kind of the blowing agent.

The melting point of the modified polypropylene resin particles is also as determined by the DSC analysis. Thus, the foamed particles sample is heated at a rate of 10° C./min to 220° C. to obtain a curve (first DSC curve) in the same manner as above. The heated sample is then cooled at a rate of 10° C./min to about 40° C. Thereafter, the sample is again heated in the same manner as in the first heating stage to give a second DSC curve. The highest peak temperature in the second DSC curve represents the melting point. The melting point is preferably at least 125° C., more preferably at least 130° C.

The area of the highest temperature peak is determined as follows. In the DSC curve (first DSC curve) C having at least two endothermic peaks P1 and P2 at temperatures T1 and T2, respectively, as shown in FIG. 1, a straight line A extending between the point Z1 in the curve at 80° C. and the point Z2 in the curve at the melt completion temperature $T_{mc}$ is drawn. In this case, the peak P2 should be the highest temperature peak, while the peak P1 should be one which is adjacent the highest temperature peak P2. Next, a line B which is parallel with the ordinate and which crosses the line A at a point $B_A$ and the DSC curve C at a point $B_C$ between the temperature T2 and T1 is drawn. The position of the point $B_C$ is such that the length between the point $B_A$ and the point $B_C$ is minimum. The area of the highest temperature peak P2 is the shaded area defined by the line A, line B and the DSC curve C.

The foamed, modified polypropylene resin particles are used for obtaining foamed molded articles. Thus, the foamed particles are placed in a mold cavity and heated so that the particles are expanded and fused bonded to each other, thereby to form a foamed molded article having a closed cellular structure. Such an article preferably has a density of 0.009–0.045 g/cm³.

The following examples will further illustrate the present invention. Parts and percentages are by weight. In the Examples, the bulk density and average cell diameter of foamed resin particles are measured as follows.

Bulk Density:

A quantity of foamed resin particles are placed in a graduated measuring cylinder to measure the volume thereof. The weight of the foamed resin particles is also measured. The bulk density C of the foamed resin particles is defined:

$$C=W/V$$

wherein V and W are the volume and the weight of the foamed particles.

Average Cell Diameter:

An arbitrarily selected foamed particle is cut nearly at the center thereof and a microphotograph of the cut surface is taken. An arbitrary straight line is drawn on the microphotograph such that the line extends from the wall of one cell and to the wall of another cell and that the line crosses at least 10 cells. The length (L) of the line and the number (N) of the cells are measured. The mean cell diameter D is calculated by the following equation:

$$D=1.62\times(L/N)$$

Similar measurement is repeated for 10 arbitrary selected foamed particles in total. The average cell diameter is an average of the mean cell diameter D of the ten foamed particles.

EXAMPLE 1

An ethylene-propylene random copolymer (100 parts) having a melting point of 140° C., a melt flow rate (MFR) of 9 g per 10 minutes and an ethylene content of 4% was mixed with 0.05 part of aluminum hydroxide (nucleus agent) and the mixture was melt and kneaded in an extruder at 220° C. The kneaded mixture was extruded through a die and cut to obtain small pellets each having a weight of about 2 mg. In an autoclave were then charged 100 parts of the pellets, 11.1 parts of styrene monomer, 300 parts of water, 15 parts of a 10% dispersion of calcium triphosphate (dispersing agent) and 0.2 part of sodium dodecylbenzene sulfonate and the contents were heated to 90° C. at a rate of about 2° C. per minute with stirring at 200 rpm and maintained at that temperature for 2 hours. The mixture was then cooled to 50° C. Subsequently, 6.5 parts of bis(4-t-butylcyclohexyl)peroxydicarbonate (10 hours half life temperature: 40.8° C., Peroyl TCP manufactured by NOF Corporation) were added into the autoclave. The mixture was heated to 65° C. at a rate of about 2° C. per minute with stirring at 200 rpm and maintained at that temperature for about 5 hours. After cooling to 40° C., the mixture in the autoclave was filtered, washed with 0.1 N hydrochloric acid and dried at about 60° C. for 24 hours to obtain modified polypropylene resin particles having a polystyrene content of 10%.

In an autoclave, 100 parts of the modified polypropylene resin particles, 300 parts of water, 3 parts of kaolin, 0.02 part of sodium dodecylbenzenesulfonate and 8 parts of carbon dioxide gas were charged. With stirring at 200 rpm, the mixture was heated to 141° C. at a rate of about 2° C. per minute and maintained at that temperature for about 15 minutes. Thereafter, the dispersion was heated to 146° C. at a rate of about 2° C. per minute and maintained at that temperature for 15 minutes. Then, one end of the autoclave was opened to discharge the dispersion in the autoclave to the air, while feeding air to the autoclave to maintain the pressure within the autoclave at 40 kg/cm²G. The thus obtained foamed particles had a bulk density of 0.045 g/cm³ and an average cell diameter of 400 μm.

EXAMPLE 2

Example 1 was repeated in the same manner as described except that the amount of styrene monomer was increased to 53.8 parts. The modified polypropylene resin particles had a polystyrene content of 35%. The foamed particles had a bulk density of 0.045 g/cm³ and an average cell diameter of 300 μm.

EXAMPLE 3

Example 1 was repeated in the same manner as described except that lauroyl peroxide (10 hours half life temperature: 61.6° C., Peroyl L manufactured by NOF Corporation) was used as the polymerization initiator, that the amount of the initiator was changed to 6 parts, and that the graft polymerization temperature was changed to 85° C. The modified polypropylene resin particles had a polystyrene content of 10%. The foamed particles had a bulk density of 0.045 g/cm³ and an average cell diameter of 200 μm.

COMPARATIVE EXAMPLE 1

Example 1 was repeated in the same manner as described except that benzoyl peroxide (10 hours half life temperature: 73.6° C., Nyper BW manufactured by NOF Corporation) was used as the polymerization initiator, that the amount of the initiator was changed to 4.5 parts, and that the graft polymerization temperature was changed to 95° C. The modified polypropylene resin particles had a polystyrene content of 10%. The foamed particles had a bulk density of 0.045 g/cm³ and an average cell diameter of 150 μm.

COMPARATIVE EXAMPLE 2

Example 1 was repeated in the same manner as described except that 1,1-bis(t-butylperoxy),3,3,5-trimethylcyclohexane (10 hours half life temperature: 90.0° C., Perhexa 3M manufactured by NOF Corporation) was used as the polymerization initiator, that the amount of the initiator was changed to 3.2 parts, and that the graft polymerization temperature was changed to 110° C. The modified polypropylene resin particles had a polystyrene content of 10%. The foamed particles had a bulk density of 0.045 g/cm³ and an average cell diameter of 130 μm.

COMPARATIVE EXAMPLE 3

Example 1 was repeated in the same manner as described except that the graft polymerization temperature was increased to 95° C. The modified polypropylene resin particles had a polystyrene content of 10%. The foamed particles had a bulk density of 0.045 g/cm³ and an average cell diameter of 150 μm.

EXAMPLES 4–8 AND COMPARATIVE EXAMPLES 4 AND 5

Preparation of Modified Resin Particles:

As raw material polypropylene resins, the following Resins (1)–(5) were used:

Resin (1): Ethylene-propylene random copolymer having a melting point of 134° C., a melt flow rate (condition 14 in Table 1 of JIS K7210) of 7 g per 10 minutes and an ethylene content of 4.5%

Resin (2): Ethylene-propylene random copolymer having a melting point of 138° C., a melt flow rate (condition 14 in Table 1 of JIS K7210) of 8 g per 10 minutes and an ethylene content of 4.1%

Resin (3): Ethylene-propylene random copolymer having a melting point of 145° C., a melt flow rate (condition 14 in Table 1 of JIS K7210) of 11 g per 10 minutes and an ethylene content of 2.5%

Resin (4): Linear low density polyethylene having density of 0.925 g/cm³, a melting point of 120° C. and a melt flow rate (condition 4 in Table 1 of JIS K7210) of 2 g per 10 minutes (comonomer: octene-1)

Resin (5): Linear low density polyethylene having density of 0.924 g/cm³, a melting point of 118° C. and a melt flow rate (condition 4 in Table 1 of JIS K7210) of 2 g per 10 minutes (comonomer: octene-1)

As polymerization initiators, the following Initiators (1)–(3) were used:

Initiator (1): lauroyl peroxide (10 hours half life temperature: 61.6° C., Peroyl L manufactured by NOF Corporation)

Initiator (2): bis(4-t-butylcyclohexyl)peroxydicarbonate (10 hours half life temperature: 40.8° C., Peroyl TCP manufactured by NOF Corporation)

Initiator (3): 1,1-bis(t-butylperoxy),3,3,5-trimethylcyclohexane (10 hours half life temperature: 90.0° C., Perhexa 3M manufactured by NOF Corporation)

A resin or resin mixture (100 parts) as shown in Table 1 was mixed with 0.05 part of aluminum hydroxide and the mixture was melt and kneaded in an extruder at 220° C. The kneaded mixture was extruded through a die and cut to obtain small pellets each having a weight of about 2 mg. In an autoclave were then charged the pellets (in an amount as shown in Table 1), styrene monomer (in an amount as shown in Table 1), 300 parts of water, 10 parts of a 10% dispersion of calcium triphosphate and 0.1 part of sodium dodecylbenzene sulfonate and the contents were heated to 95° C. at a rate of about 2° C. per minute with stirring and maintained at that temperature for 2 hours to impregnate the pellets with the styrene monomer. The mixture was then cooled to 50° C. Subsequently, a radical polymerization initiator as shown in Table 1 was added into the autoclave in an amount as shown in Table 1 (the amount of the initiator is part per 100 parts of a total of the pellets and the styrene monomer). The mixture was heated to a temperature T1 as shown in Table 1 at a rate of about 2° C. per minute with stirring at 200 rpm and maintained at that temperature for about 5 hours. After cooling to 40° C., the mixture in the autoclave was filtered, washed with 0.1 N hydrochloric acid and dried at about 60° C. for 24 hours to obtain modified polypropylene resin particles. The polystyrene content and the melting point of the modified polypropylene resin particles are also shown in Table 1.

TABLE 1

| | | | | | | | |
|---|---|---|---|---|---|---|---|
| Example | 4 | 5 | 6 | 7 | 8 | | |
| Comparative Example | | | | | | 4 | 5 |
| Resin (1) (part) | | | | 64 | | | |
| Resin (2) (part) | 90 | 90 | 64 | | | 90 | 64 |
| Resin (3) (part) | | | | | 75 | | |
| Resin (4) (part) | | | | 16 | | | |
| Resin (5) (part) | | | 16 | | | | 16 |
| styrene | 10 | 10 | 20 | 20 | 25 | 10 | 20 |

TABLE 1-continued

| Example | 4 | 5 | 6 | 7 | 8 | | |
|---|---|---|---|---|---|---|---|
| Comparative Example | | | | | | 4 | 5 |
| Monomer (part) | | | | | | | |
| Initiator (1) (part) | | | 0.62 | 1.24 | | | |
| Initiator (2) (part) | | 0.67 | | | 1.34 | 1.55 | |
| Initiator (3) (part) | | | | | | 0.26 | 0.52 |
| Polymerization Temperature T1 (° C.) | 65 | 85 | 85 | 65 | 65 | 110 | 110 |
| Melting Point (° C.) | 138 | 138 | 137 | 134 | 144 | 137 | 137 |
| Amount of Polystyrene (%) | 9.8 | 9.8 | 19 | 19 | 25 | 9.9 | 9.9 |

Preparation of Foamed, Modified Resin Particles:

In an autoclave, 100 parts of the above modified polypropylene resin particles, 300 parts of water, 0.3 part of kaolin, 0.02 part of sodium dodecylbenzenesulfonate and 8 parts of carbon dioxide (dry ice) were charged. With stirring, the mixture was heated to a temperature T2 as shown in Table 2 at a rate of about 2° C. per minute and maintained at that temperature for about 15 minutes. Thereafter, the dispersion was heated to a temperature T3 as shown in Table 2 at a rate of about 2° C. per minute and maintained at that temperature for 15 minutes. Then, one end of the autoclave was opened to discharge the dispersion in the autoclave to the air, while feeding air to the autoclave to maintain the pressure within the autoclave at 45 kg/cm²G. The thus obtained foamed particles (A) had a bulk density as shown in Table 2. The foamed particles (A) were placed in a pressurized air chamber at room temperature to obtain foamed particles (B) having an inside pressure as shown in Table 2. The particles (B) were treated in a closed chamber with super-heated steam of 0.7 kg/cm²G to obtain foamed particles (C). The bulk density and the average cell diameter of the foamed particles (C) are shown in Table 2. The highest temperature peak in the DSC curve of the foamed particles (C) had an area corresponding to the calorific value as shown in Table 2.

TABLE 2

| Example | 4 | 5 | 6 | 7 | 8 | | |
|---|---|---|---|---|---|---|---|
| Comparative Example | | | | | | 4 | 5 |
| Treatment Temperature T2 (° C.) | 141.0 | 141.0 | 137.0 | 138.5 | 142.5 | 141.0 | 137.0 |
| Expansion Temperature T3 (° C.) | 146.0 | 146.0 | 142.0 | 143.5 | 147.5 | 146.0 | 142.0 |
| Bulk Density of Particles (A) (g/cm³) | 0.039 | 0.040 | 0.042 | 0.038 | 0.10 | 0.046 | 0.045 |
| Inside Pressure of Particles (B) (atm) | 3.3 | 2.7 | 4.5 | 3.3 | 3.5 | 4.4 | 4.6 |
| Bulk Density of Particles (C) (g/cm³) | 0.014 | 0.015 | 0.013 | 0.017 | 0.041 | 0.015 | 0.016 |
| Average Cell Diameter of Particles (C) (μm) | 380 | 320 | 400 | 350 | 220 | 120 | 80 |
| Calorific Value of Highest Temperature Peak (J/g) | 16 | 16 | 9 | 6 | 26 | 16 | 9 |

Preparation of Molded Articles:

The foamed particles (C) were placed in a pressurized air chamber at room temperature to increase the inside pressure thereof to a value as shown in Table 3. This pressure was so selected as to obtain a molded product free of voids. The resulting particles were placed in a mold having an inside size of 60 mm×300 mm×300 mm and preheated with super-heated steam and then heated with super-heated steam at a pressure as shown in Table 3. The mold was then cooled with water for a time as shown in Table 3 and the molded product was released from the mold. The cooling time adopted was a minimum value sufficient to prevent the later expansion of the molded product after release from the mold. The molded product was dried at 80° C. for 24 hours and measured for the density. The results are shown in Table 3.

TABLE 3

| Example | 4 | 5 | 6 | 7 | 8 | | |
|---|---|---|---|---|---|---|---|
| Comparative Example | | | | | | 4 | 5 |
| Inside pressure of Particles (B) (atm) | 1.0 | 1.7 | 1.0 | 1.5 | 2.2 | 2.6 | 2.4 |
| Pressure of Steam (kg/cm²G) | 1.7 | 1.7 | 1.4 | 1.4 | 2.6 | 2.0 | 1.8 |
| Cooling Time (second) | 50 | 62 | 30 | 40 | 120 | 320 | 350 |
| Density of Molded Product (g/cm³) | 0.018 | 0.017 | 0.018 | 0.020 | 0.044 | 0.016 | 0.018 |

What is claimed is:

1. A foamed, non-crosslinked resin particle having a bulk density of not greater than 0.045 g/cm³ and an average cell diameter of at least 200 μm, said non-crosslinked resin comprising a polypropylene resin to which a vinyl comonomer is graft-polymerized in such an amount that the weight ratio of said polypropylene resin to said grated polymer of said vinyl comonomer is in the range of 97:3 to 65:35, wherein said foamed, non-crosslinked resin particle has a melting point of at least 125° and a DSC curve by differential scanning calorimetry that includes at least two endothermic Peaks and wherein the highest of the at least two endothermic peaks has an area corresponding to the calorific value of 2–25 J/g when the modified polypropylene resin has a melting point of 150° C. or less or 5–40 J/g when the modified polypropylene resin has a melting point of more than 150° C.

2. A foamed, non-crosslinked resin particle as claimed in claim 1 having a bulk density of 0.006–0.03 g/cm³.

3. A foamed, non-crosslinked resin particle as claimed in claim 1 and having an average cell diameter of 250–600 μm.

4. A foamed, non-crosslinked resin particle as claimed in claim 1, wherein said non-crosslinked resin has a melting point of 150° C. or less and wherein said non-crosslinked resin particle provides at least two endothermic peaks in a DSC curve obtained by differential scanning calorimetry, wherein the highest temperature peak among said at least two endothermic peaks has an area corresponding to the calorific value of 2–25 J/g.

5. A foamed, non-crosslinked resin particle as claimed in claim 1, wherein said non-crosslinked resin has a melting point of more than 150° C. and wherein said non-crosslinked resin particle provides at least two endothermic peaks in a DSC curve obtained by differential scanning calorimetry, wherein the highest temperature peak among said at least two endothermic peaks has an area corresponding to the calorific value of 5–40 J/g.

6. A method of producing foamed, non-crosslinked resin particles, having a melting point of at least 125° C. comprising the steps of:

grafting 3–35% by weight of a vinyl comonomer to polypropylene resin particles dispersed in an aqueous medium, said grafting being conducted at a temperature of less than 90° C. and in the presence of a radical polymerization initiator, requiring a temperature of not higher than 70° C. for obtaining a half life of 10 hours, to produce modified resin particles, maintaining the modified resin particles dispersed in the aqueous medium at a temperature between said melting point and their melt-completion temperature for 5–90 min; and then foaming said modified resin particles.

7. A method as claimed in claim 6, wherein said grafting is performed at a temperature of 50–89° C.

8. A method as claimed in claim 6, wherein said initiator is a compound selected from the group consisting of bis(4-t-butylcyclohexyl)peroxydicarbonate, 1-cyclohexyl-1-methylethylperoxyneodecanoate, di(2-ethoxyhexylperoxy)dicarbonate, dimethoxybutylperoxydicarbonate, t-butylperoxyneodecanoate, t-hexylperoxypivalate, t-butylperoxypivalate, octanoylperoxide, stearoylperoxide, lauroylperoxide, isobutyrylperoxide, α,α'-bis(neodecanoylperoxy)diisopropylbenzene, cumylperoxyneodecanoate, di-n-propylperoxydicarbonate, 1,1,3,3-tetramethylbutylperoxyneodecanoate, di-2-ethoxyethylperoxydicarbonate, di(3-methyl-3-methoxybutylperoxy)dicarbonate, t-butylperoxyneodecanoate, 2,4-dichlorobenzoylperoxide, 3,5,5-trimethylhexanoyl-peroxide, 1,1,3,3-tetramethylbutylperoxy-2-ethylhexanoate, succinicperoxide, 2,5-dimethyl-2,5-di(2-ethylhexanoylperoxy)hexane, 1-cyclohexyl-1-methylethylperoxy-2-ethylhexanoate and t-hexylperoxy-2-ethylhexanoate.

9. A method as claimed in claim 6 wherein said foaming comprises:

heating the modified resin particles to a temperature higher than their softening point;

impregnating the heated resin particles with a blowing agent under pressure; and reducing the pressure to cause the impregnated resin particles to foam and expand.

10. A method as claimed in claim 9 further comprising dispersing the modified resin particles in a liquid medium and wherein said impregnation with the blowing agent is by contact of the blowing agent with the liquid dispersion of the modified resin particles.

11. A foamed, non-crosslinked resin particle as claimed in claim 1 wherein said range is 95:5 to 70:30.

12. A method as claimed in claim 6 wherein said foaming produces a non-crosslinked resin particle having a bulk density of not greater than 0.045 g/cm$^3$, an average cell diameter of at least 200 μm, a melting point of at least 125° C. and a DSC curve by differential scanning calorimetry that includes at least two endothermic peaks and wherein the highest of the at least two endothermic peaks has an area corresponding to the calorific value of 2–25 J/g when the modified polypropylene resin has a melting point of 150° C. or less or 5–40 J/g when the modified polypropylene resin has a melting point of more than 150° C.

* * * * *

UNITED STATES PATENT AND TRADEMARK OFFICE
CERTIFICATE OF CORRECTION

PATENT NO.   : 6,051,617
DATED        : April 18, 2000
INVENTOR(S)  : Sasaki et al.

It is certified that error appears in the above-identified patent and that said Letters Patent is hereby corrected as shown below:

Title page,
References Cited, "8-087780" should read -- 9-087780 --.

Renumber claims 6-12 as 4-10, respectively.

Column 11,
Line 27, "in the" should read -- in an --.

Signed and Sealed this

Twentieth Day of November, 2001

Attest:

NICHOLAS P. GODICI
*Attesting Officer*   Acting Director of the United States Patent and Trademark Office